United States Patent
Sato et al.

(10) Patent No.: US 8,031,717 B2
(45) Date of Patent: Oct. 4, 2011

(54) COMMUNICATION APPARATUS AND COMMUNICATION METHOD

(75) Inventors: Jun Sato, Kokubunji (JP); Yuji Kawashima, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 12/327,986

(22) Filed: Dec. 4, 2008

(65) Prior Publication Data

US 2009/0198713 A1 Aug. 6, 2009

(30) Foreign Application Priority Data

Feb. 6, 2008 (JP) .................................. 2008-026046

(51) Int. Cl.
*H04L 12/28* (2006.01)

(52) U.S. Cl. ........ 370/394; 370/474; 370/389; 382/233; 386/278; 386/279; 386/280; 386/281; 386/282; 386/283; 386/284; 386/285; 386/286; 386/287; 386/288; 386/289; 386/290; 386/248; 725/115; 725/116; 725/117; 725/63

(58) Field of Classification Search .................. 370/389, 370/394, 474; 382/232, 233; 386/52–64, 386/248, 278–290; 725/114–117, 63
See application file for complete search history.

(56) References Cited

U.S. PATENT DOCUMENTS

| | | | | |
|---|---|---|---|---|
| 6,289,164 B1 * | 9/2001 | Hori et al. | ...................... | 386/328 |
| 6,819,394 B1 * | 11/2004 | Nomura et al. | .................. | 352/38 |
| 7,493,027 B2 * | 2/2009 | Ando et al. | ..................... | 386/248 |
| 2004/0141722 A1 * | 7/2004 | Morishita | ........................ | 386/52 |
| 2006/0093315 A1 * | 5/2006 | Kelly et al. | ...................... | 386/52 |
| 2009/0086735 A1 * | 4/2009 | Tsang | ........................... | 370/394 |
| 2009/0136145 A1 * | 5/2009 | Morimoto et al. | ............ | 382/233 |

FOREIGN PATENT DOCUMENTS

JP 2002-140883 A 5/2002

* cited by examiner

*Primary Examiner* — Christopher Grey

(74) *Attorney, Agent, or Firm* — Holtz, Holtz, Goodman & Chick, PC (57) ABSTRACT

When stored stream data is deleted/edited, the packet sequence completely included in a deletion range is deleted from the stream data, and the stream data is segmented into first stream data before the start point of the deletion range and second stream data after the end point of the deletion range. First and second stream management data corresponding to the first and second stream data are generated. The index value of the packet including the start point of the deletion range is written in the header of the first stream management data. The index value of the packet including the end point of the deletion range is written in the header of the second stream management data. In addition, an index base value for correcting the index value is written in the header of the second stream management data.

12 Claims, 9 Drawing Sheets

COMMUNICATION APPARATUS AND COMMUNICATION METHOD

CROSS-REFERENCE TO RELATED APPLICATIONS

This application is based upon and claims the benefit of priority from prior Japanese Patent Application No. 2008-026046, filed Feb. 6, 2008, the entire contents of which are incorporated herein by reference.

BACKGROUND OF THE INVENTION

1. Field of the Invention

The present invention relates to a communication apparatus including a function of editing a video content recorded in a storage medium using, for example, a NAND type flash memory, and a terminal apparatus including the editing apparatus.

2. Description of the Related Art

Some television receiver or video recorder compatible capable of receiving terrestrial digital broadcasting includes a function of storing a received program content in a portable storage medium using a NAND type flash memory such as a memory card. Storing a desired program content in a storage medium by using this type of apparatus allows the user to play the above program content in another room, a place outside his/her house, or the like by loading the storage medium into another television reception apparatus or a personal computer. Note that the program content stored in the recording medium is encrypted for copyright protection. There is also proposed a technique of letting the above apparatus have a function of editing the program content stored in a storage medium. This function allows editing processing, e.g., deleting a portion of a program content and leaving only a necessary portion.

When the above program content is to be deleted/edited, for example, the following processing is conventionally performed. First of all, the stream data of an encrypted program content stored in a storage medium is decoded. That portion of the decoded data which corresponds to the deletion range designated by the user is deleted. Portions before and after the deleted portions are re-encoded, and the re-encoded stream data is re-encrypted. Thereafter, the stream data of the program content after this re-encryption is stored in the storage medium again (see, for example, Jpn. Pat. Appln. KOKAI Publication No. 2002-140883).

Such a conventional deleting/editing function requires multi-stage processing for the data of a program content stored in the storage medium, e.g., decrypting/decoding an encrypted program content, deleting a portion of the data, and re-encoding and re-encrypting the data after the deletion. Of these processes, the decoding process, re-encoding process, and re-encryption process of video data, in particular, require very large processing amounts, resulting in a very long time for editing processing. This problem becomes especially remarkable when a flash memory is used as a storage medium, because the read-in and write-out speeds of the flash memory are significantly slow.

BRIEF SUMMARY OF THE INVENTION

It is an object of the present invention to provide a content editing apparatus which enables editing a content stored in a storage medium in a short period of time without requiring any complicated processing, and a terminal apparatus including the communication apparatus.

In order to achieve the above object, according to an aspect of the present invention, there is provided a communication apparatus which stores, in a storage medium, stream data which has consecutive packet sequences in which a plurality of packets in which contents are inserted are multiplexed and is encrypted on a sequence of packet basis, and stream management data which includes meta data for managing and controlling the stream data in correspondence with each other. Upon receiving information which designates a deletion range of stream data stored in the storage medium, the apparatus segments stream data stored in the storage medium into first stream data from a packet sequence located at the head of the stream data to a packet sequence including the start point of the designated deletion range and second stream data from a packet sequence including the end point of the designated deletion range to a packet sequence located at the back end of the stream data, and deletes other packet sequences. In addition, the apparatus generates first and second stream management data respectively corresponding to the segmented first and second stream data on the basis of stream management data stored in the storage medium, and writes information representing the position of a packet including the start point of the deletion range as the end point information of the first stream data in the generated first stream management data. The apparatus also writes information representing the position of a packet including the end point of the deletion range as the restart point information of the second stream data in the second stream management data. Furthermore, the apparatus additionally writes correction information for correcting mismatch between the segmented first and second stream data in the second stream management data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the views of the accompanying drawing.

Figure 1:
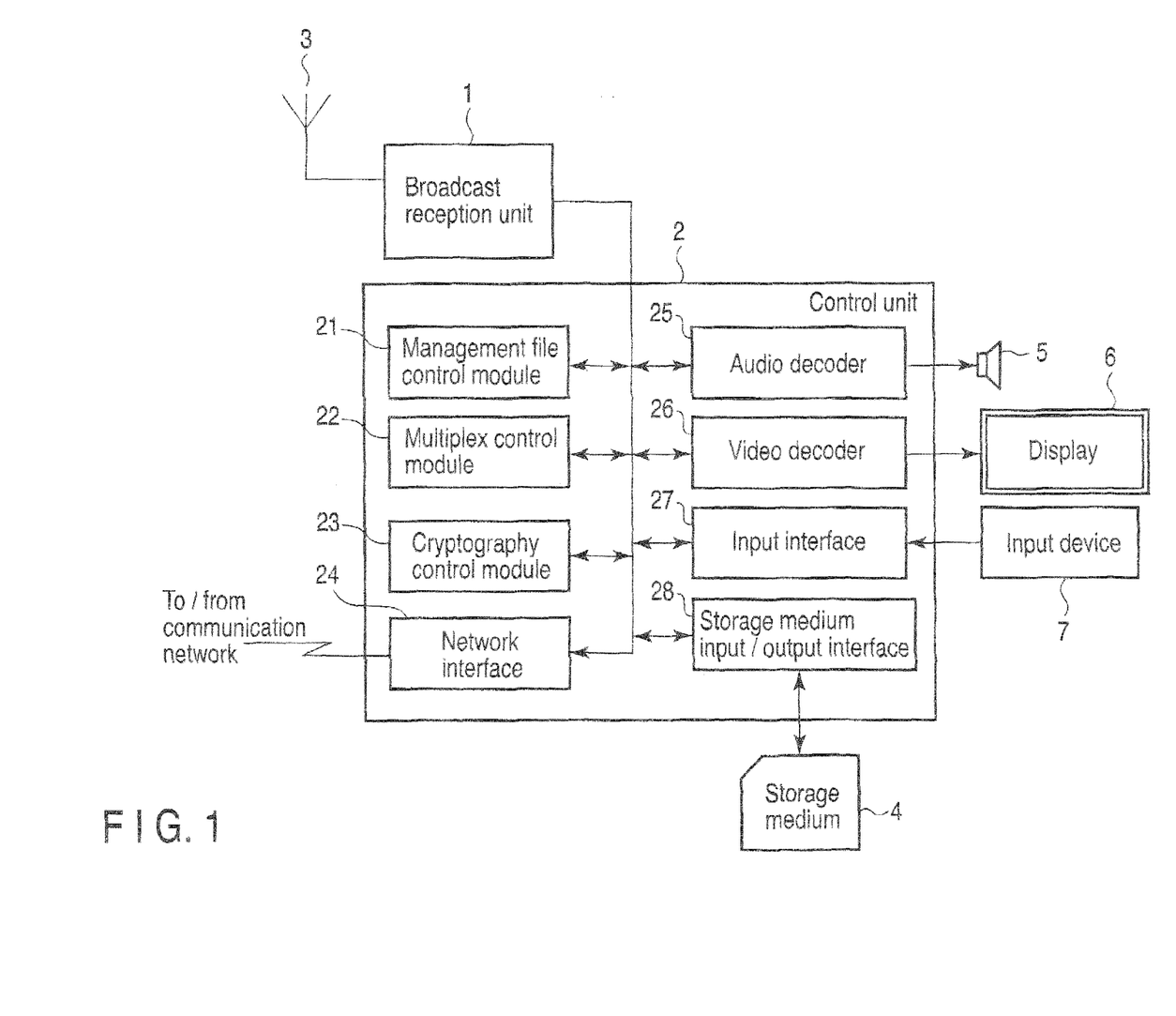
FIG. 1 is a block diagram showing the arrangement of a television reception terminal apparatus including a content editing function according to an embodiment of the present invention.

FIG. 1 is a block diagram showing the arrangement of a communication apparatus such as a television reception apparatus including a content editing function according to an embodiment of the present invention. This television reception apparatus comprises a broadcast reception unit 1 and a control unit 2.

The broadcast reception unit 1 receives broadcast waves such as satellite digital broadcast waves or terrestrial digital broadcast waves via an antenna 3, and selects a broadcast wave corresponding to the channel designated by an input device 7 from the received broadcast waves. The broadcast reception unit 1 then demodulates the broadcast signal corresponding to the selected channel and outputs the baseband stream obtained by the demodulation to the control unit 2.

The control unit 2 comprises, as functional modules associated with the present invention, a management file control module 21, a multiplex control module 22, a cryptography control module 23, a network interface 24, an audio decoder 25, a video decoder 26, an input interface 27, and a storage medium input/output interface 28. Note that these functions are implemented by making a CPU (Central Processing Unit) or a DSP (Digital Signal Processor) execute application programs. However, the present invention is not limited to this. For example, an audio decoder and a video decoder can be dedicated integrated circuits.

The network interface 24 is an interface for communicating with, for example, a LAN (Local Area Network), which is used to acquire a content from a server on the Internet by connecting to the server via a LAN. The input interface 27 receives operation information from the input device 7. As the input device 7, various switches provided on the television reception apparatus body and a remote controller are used. The storage medium input/output interface 28 has a slot in which a storage medium 4 is detachably loaded, and performs writing/reading of stored data in/from the storage medium 4 loaded in the slot. Note that a memory card using a NAND type flash memory is used as the storage medium 4.

The multiplex control module 22 captures a baseband stream from the broadcast reception unit 1 and the network interface 24, and separates video, audio, and data packets from the baseband stream. The multiplex control module 22 then depackets the respective separated packets and supplies the encoded video information and data to the video decoder 26, and the encoded audio information to the audio decoder 25. The multiplex control module 22 also supplies the control information or management information acquired by the separation to the management file control module 21 and makes the storage medium 4 store the information as stream management data.

The video decoder 26 outputs a video signal by decoding encoded video information, supplied from the multiplex control module 22, in accordance with the MPEG-2 scheme or the H.264 scheme. The video decoder 26 supplies this video signal to a display 6 upon combining it with data supplied together with the video information, and causes the display 6 to display the resultant data. The audio decoder 25 outputs an audio signal by decoding encoded audio information, supplied from the multiplex control module 22, in accordance with, for example, the AAC scheme. The audio decoder 25 then causes a loudspeaker 5 to amplify/output this audio signal as sound.

When causing the storage medium 4 to store the baseband stream received from the broadcast reception unit 1 and the baseband stream acquired by the network interface 24, the cryptography control module 23 encrypts the baseband streams on a TS packet sequence basis. When playing a baseband stream stored in the storage medium 4, the cryptography control module 23 decrypts the encrypted baseband stream read out by the storage medium input/output interface 28 from the storage medium 4, and outputs the decrypted baseband stream to the multiplex control module 22. As management information such as cryptography keys necessary for the above encryption and corresponding decryption processing, the information of stream management data stored in the storage medium 4 is acquired from the management file control module 21.

The management file control module 21 manages the baseband streams stored in the storage medium 4, and has a recording/playing control function for baseband streams and a deleting/editing function for the stored baseband streams.

Of these functions, the recording/playing control function controls the storage medium 4 to store the baseband stream received from the broadcast reception unit 1 and the baseband stream acquired by the network interface 24 in accordance with a predetermined recording format, when a recording instruction is input by the input device 7. In addition, when a playing instruction is input by the input device 7, the recording/playing control function executes control to read out and play a baseband stream as a playing target from the storage medium 4.

Figure 3:
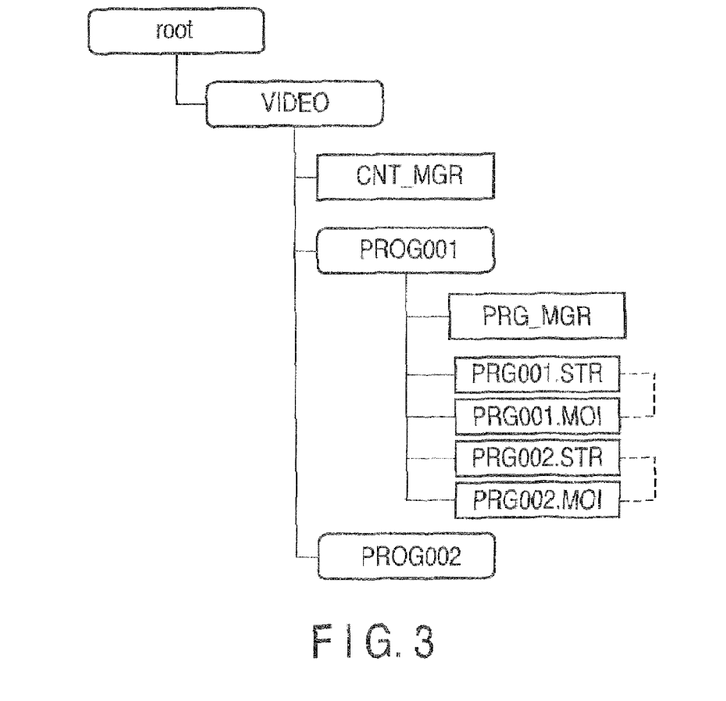
FIG. 3 is a view showing an example of the recording format of a program content in a storage medium.

The recording format of the baseband stream will be described below. FIG. 3 is a view showing an example of this recording format.

That is, a directory called "VIDEO" is generated under the root directory (root) in the storage medium 4, and a plurality of program directories are listed and stored under "VIDEO". The program directories are named in the form of "PROGxxx", with the portion "xxx" being expressed by consecutive numbers like "001", "002", . . . , which are obtained by sequentially incrementing a given number. In addition, a file called "CONT_MGR" is generated under the directory "VIDEO". In this file, management information associated with the program directories is stored.

A group of files constituting a program (program content) is stored in a program directory. This group of files includes stream data, stream management data, and program management data. One program comprises one program management data and one or a plurality of stream data. Stream management data is paired with stream data. Stream data has the file name "PRGxxx.STR" as a naming format, with the portion "xxx" being expressed by numbers like "001", "002", . . . , which are obtained by sequentially incrementing a given number. Stream management data has the file name "PRGxxx.MOI" as a naming format, with the portion "xxx" being expressed by numbers like "001", "002", which are obtained by sequentially incrementing a given number. Note that file names having identical numerical portions like "PRG001.STR" and "PRG001.MOI" indicate that the stream data is paired with the stream management data.

When stream data reaches the upper limit of a predetermined file length, next stream data is generated. For example, following the stream data "PRG001.STR", "PRG002.STR" is generated. Note that the numerical portions of file names need not always be sequential numbers. Stream data can be seamlessly played by referring to the numbers of stream data immediately preceding and succeeding the stream data written in stream management data with which it is paired.

Figure 4:
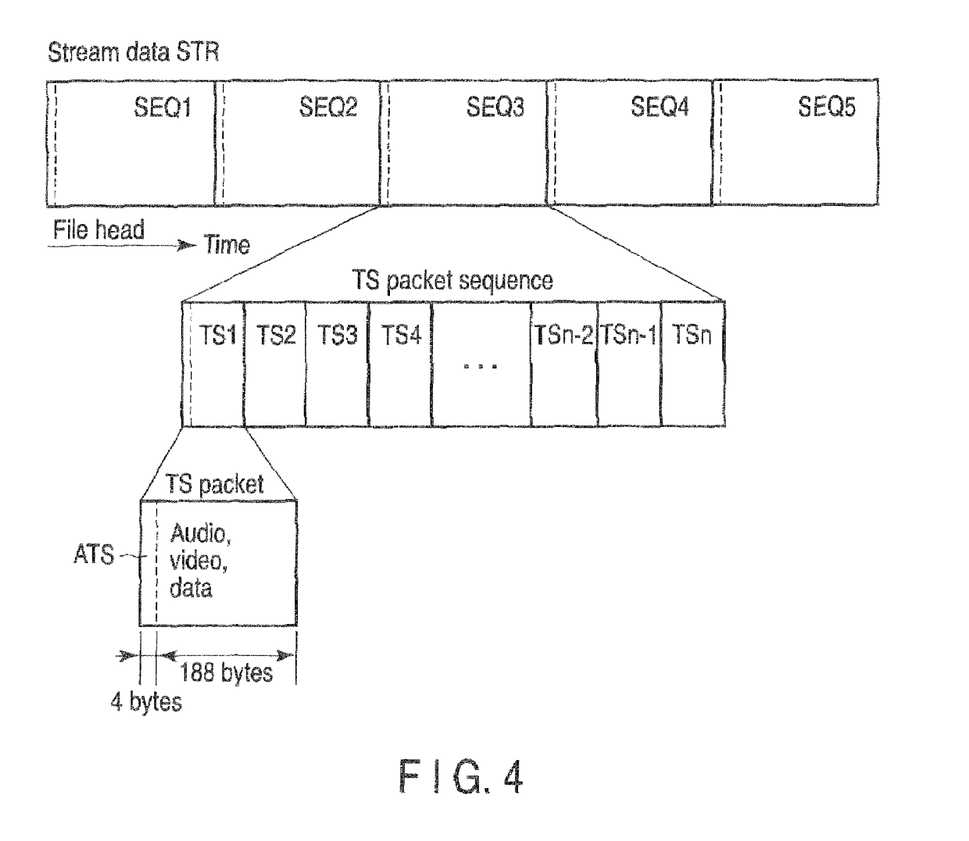
FIG. 4 is a view showing the arrangement of the stream data file of the program content shown in FIG. 3.

Stream data has the following arrangement. FIG. 4 is a view showing an example of the arrangement. Stream data STR is obtained by time-divisionally multiplexing a plurality of TS packet sequences SEQ1 to SEQ5. A plurality of TS (Transport Stream) packets TS1 to TSn are time-divisionally multiplexed on each of the TS packet sequences SEQ1 to SEQ5. A number n of TS packets to be multiplexed is set for each stream data, and is set to, for example, n=32, 128, 256. The number n of TS packets to be multiplexed is defined by being written in stream management data (to be described later).

A 32-bit (4-byte) ATS (Arrival Time Stamp) is attached to the head of the TS packet TS1, of the TS packets TS1 to TSn, which is located at the head of each of the TS packet sequences SEQ1 to SEQ5. In an ATS, the time when the TS packet has been received by the television reception terminal apparatus is written. This reception time is measured at a period of 27 MHz. If the stream data STR is input to a device by a means other than broadcasting, an ATS is attached to the stream data in advance in some case. The TS scheme is a scheme defined by the MPEG-2 system. Media streams, i.e., video, audio, and data streams, are multiplexed and inserted in each of the TS packets TS1 to TSn.

In addition, stream data is encrypted for each of the TS packet sequences SEQ1 to SEQ5. As cryptography, for example, a CBC (Cipher Block chaining) mode of an AES (Advanced Encryption Standard) scheme, which is a secret key cryptography, is used. In this case, the stream data is not encrypted from the head of each of the TS packet sequences SEQ1 to SEQ5 but is encrypted with a predetermined offset. Representing this offset with 4 bytes corresponding to the above ATS allows referring to the ATS of the TS packet located at the head of each of the TS packet sequences SEQ1 to SEQ5 without decryption. Note that the secret key for encrypting and decrypting the above content is stored in a protected area in the storage medium 4. Only a device which has succeeded mutual authentication with the storage medium 4 can access this protected area, in which a key file (not shown) corresponding to each stream data is stored.

Figure 5:
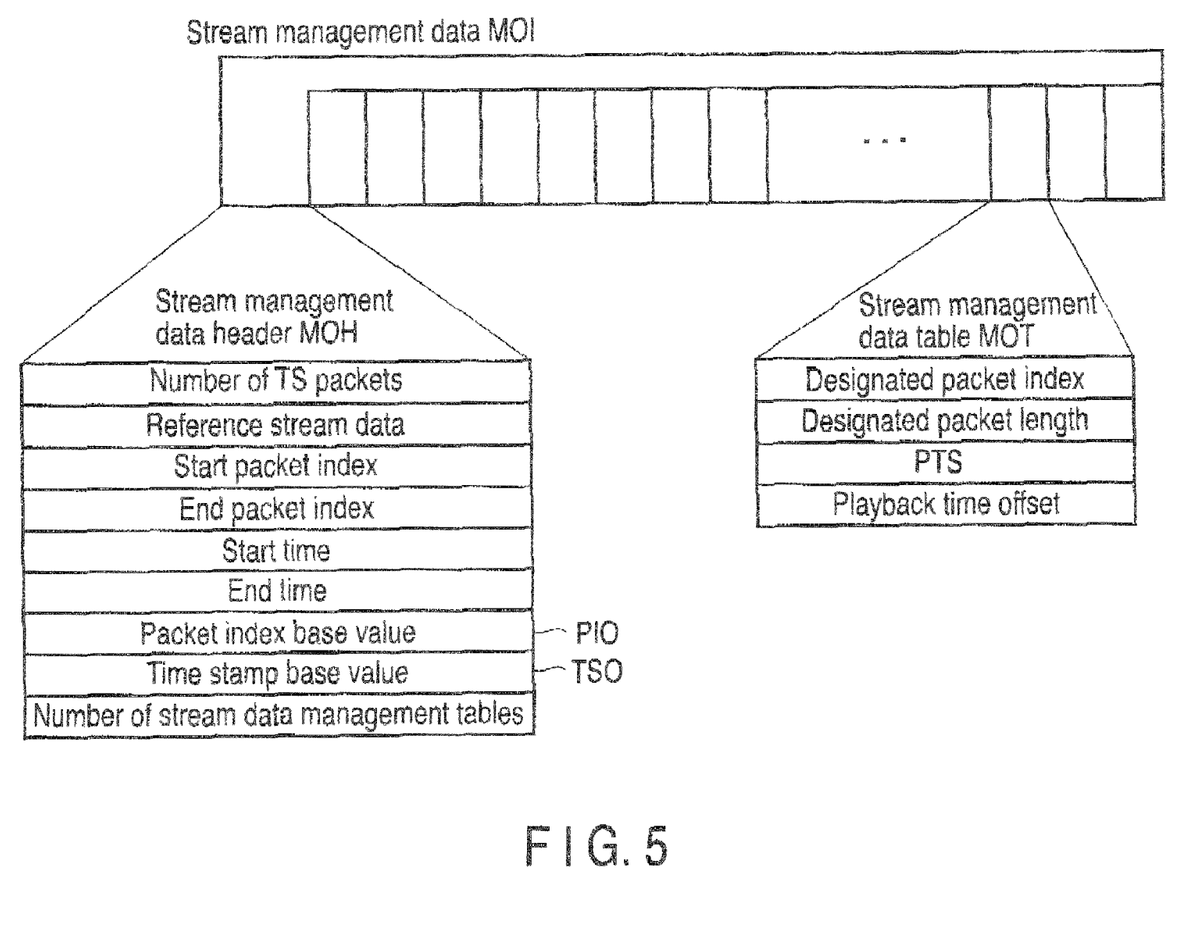
FIG. 5 is a view showing the arrangement of the stream management data of the program content shown in FIG. 3.

Stream management data has the following arrangement. FIG. 5 is a view showing the arrangement. That is, stream management data MOI comprises, for example, a plurality of management tables MOT and one stream management data header MOH.

The following are stored in the stream management data header MOH: the number of TS packets, reference stream data, a start packet index, an end packet index, a start time, an end time, and the number of stream management data tables. In addition, a packet index base value PIO and a time stamp base value TSO, which are newly set to implement the present invention, are stored in this header.

The number of TS packets is a field for designating the number of TS packets TS1 to TSn constituting each of the TS packet sequences SEQ1 to SEQ5. When a program comprises a plurality of stream data STR, reference stream data designates the numbers of stream data STR to be played before and after a given stream data. If the stream data STR is used singly or there are neither preceding stream data STR nor succeeding stream data STR, "0" is designated.

A start packet index designates the start position of a TS packet in a playing range when the corresponding stream data STR is played. Note that packets preceding the packet designated by this start packet index are skipped. The TS packets TS1 to TSn are assigned with index numbers from the head of the stream data STR. Index numbers are determined by absolute positions in the stream data STR.

An end packet index designates the last TS packet index number in the playing range when the corresponding stream data STR is played. Note that packets after the packet designated by this end packet index are skipped. If a start packet index is designated, TS packets after the designated packet index fall within the playing range. In contrast to this, if an end packet index is designated, TS packets before the designated packet index fall within the playing range.

A start time and an end time respectively designate an effective play start position and an effective playing end position in the stream data STR like the start packet index and end packet index described above, and designate the respective positions with the respective times.

Note that an effective playing range in the stream data STR can be designated by one or both of the above combination of a start packet index and an end packet index and the combination of a start time and an end time. In addition, an effective playing range can be designated by a combination of a start packet index and an end time or a combination of a start time and an end packet index.

The packet index base value PIO designates the base value of a designated packet index in the stream management data table MOT to be described later. The packet index base value PIO will be described in detail later. The time stamp base value TSO designates the base value of a playing time offset in the stream management data table MOT to be described later. The time stamp base value TSO will be described later in detail.

Figure 6:
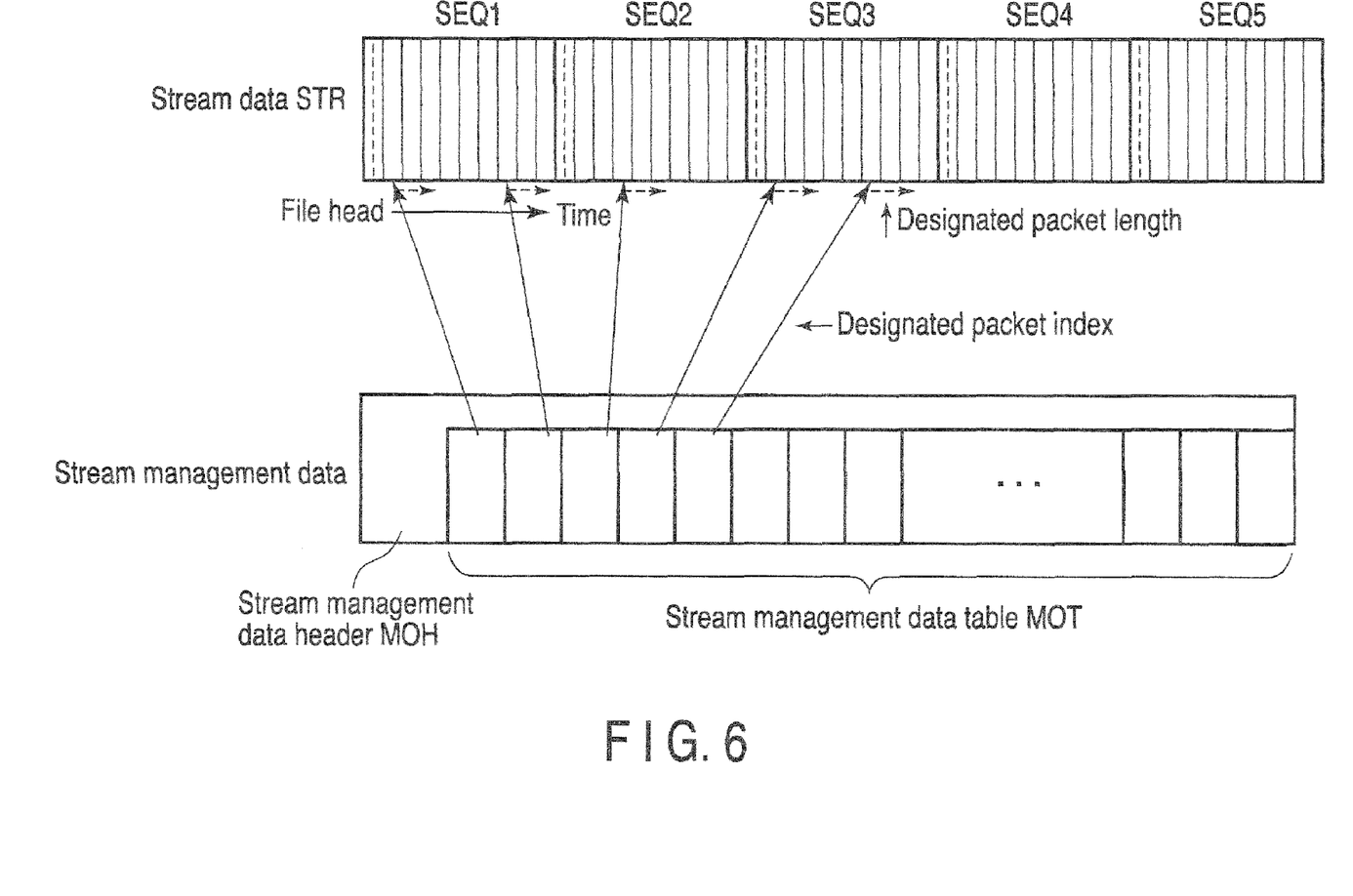
FIG. 6 is a view showing the relationship between the stream data file shown in FIG. 4 and the stream management data shown in FIG. 5.

As shown in, for example, FIG. 6, stream management data tables MOT are generated at positions in the video stream STR at which random access can be performed. In the case of the MPEG-2 scheme, the stream management data table MOT is generated in each intraframe (I frame). Designating the position of an I frame using the stream management data table MOT facilitates a search for the decoding start point of a video stream when trick play such as random access playing or fast forward playing is performed.

As shown in FIG. 5, the stream management data table MOT stores a designated packet index, a designated packet length, a PTS (Presentation Time Stamp), and a playing time offset. The designated packet index stores the number of a TS packet containing an I frame (Intra-coded frame) serving as a decoding start point as described above. This designated packet index is generated by being counted from the head of the video stream STR, as described above. If, however, the packet index base value PIO is stored in the above stream management data header MOH, the value of the designated packet index is corrected by subtracting the packet index base value PIO therefrom, and the corrected value becomes an actual packet index value in the stream data STR. A designated packet length designates how many TS packets need to be acquired from the designated packet index to decode at least one entire I frame.

A PTS stores the playing time of a packet indicated by a designated packet index. A playing time offset indicates a temporal timing from the head of the stream data STR. If a time stamp base value is stored in the stream management data header MOH, the PTS value is corrected by subtracting the time stamp base value therefrom, and the corrected value becomes a stream playing time and the approximate playing time of a temporal timing.

Figure 2:
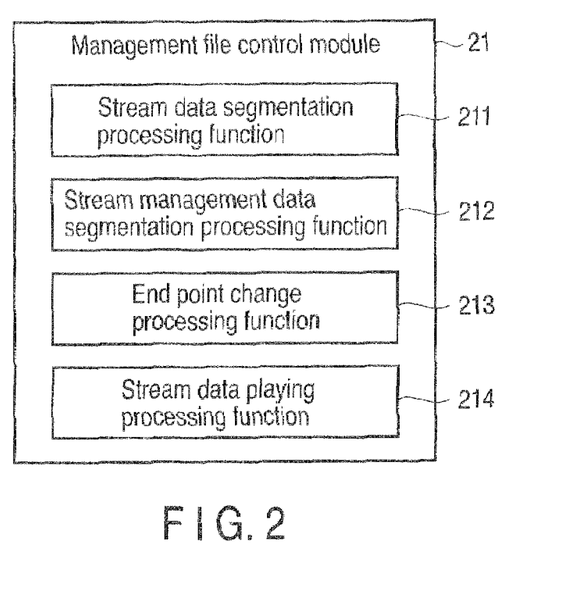
FIG. 2 is a functional block diagram showing the arrangement of the main part of the television reception terminal apparatus shown in FIG. 1.

The management file control module 21 has the following functions as processing functions associated with the present invention. FIG. 2 is a block diagram showing the arrangement of the functions. That is, the management file control module 21 has a stream data segmentation processing function 211, a stream management data segmentation processing function 212, an end point change processing function 213, and a stream data playing processing function 214.

The stream data segmentation processing function 211 performs the following processing. When the input device 7 inputs a delete/edit instruction for the stream data STR stored in the storage medium 4 and information representing the corresponding deletion range, the stream data segmentation processing function 211 reads out the corresponding stream data STR from the storage medium 4. The information representing the deletion range comprises, for example, frame numbers at a deletion start point and a deletion end point or playing times or PTSs at the deletion start point and the deletion end point. The stream data segmentation processing function 211 deletes the packet sequence in the readout stream data STR which is completely included in the designated deletion range while keeping the stream data STR encrypted. The readout stream data STR is segmented into first stream data STR11 and second stream data STR12 by this deletion processing. The first stream data STR11 ranges from the packet sequence located at the head of the stream data STR to the packet sequence including the start point of the designated deletion range. The second stream data STR12 ranges from the packet sequence including the end point of the designated deletion range to the packet sequence located at the back end of the stream data.

Subsequently, the stream data segmentation processing function 211 causes the storage medium 4 to store the segmented first and second stream data STR11 and STR12 in place of the stream data STR which has been stored before deleting/editing processing. The processing of causing the storage medium 4 to store the segmented first and second stream data STR11 and STR12 may be the processing of deleting the stream data STR before segmentation and separately recording the first and second stream data STR11 and STR12 or the processing of segmenting the stream data STR into the first and second stream data STR11 and STR12 by file system operation without changing the physically recorded state of the stream data STR in the storage medium 4 before segmentation, and deleting an unnecessary portion.

The stream management data segmentation processing function 212 performs the following processing upon segmentation processing of the stream data. That is, the stream management data segmentation processing function 212 reads out the stream management data MOI corresponding to the stream data STR as the deleting/editing processing target from the storage medium 4, and generates first and second stream management data MOI11 and MOI12 corresponding to the segmented first and second stream data STR11 and STR12 on the basis of the stream management data MOI.

Note that the processing of causing the storage medium 4 to store the segmented first and second stream management data MOI11 and MOI12 may be the processing of deleting the stream management data MOI before segmentation and separately recording the first and second stream management data MOI11 and MOI12. Alternatively, it suffices to segment the management table MOT of the stream management data MOI in accordance with the first and second stream data STR11 and STR12 by file system operation without changing the physically recorded state of the stream management data MOI in the storage medium 4 before segmentation, delete an unnecessary portion, and record the first half portion as the first stream management data MOI11 and the second half portion as the second stream management data MOI12 upon concatenating it to a newly recorded stream management data header.

In this case, in a header MOH11 of the generated first stream management data MOI11, the packet index value of the packet including the start point of the deletion range is written as an end packet index (end point). In a header MOH12 of the second stream management data MOI12, the index value of the packet including the end point of the deletion range is written as a start packet index (start point). In addition, in the header MOH11 of the first stream management data MOI11, no data is written, and in the header MOH12 of the second stream management data MOI12, the packet index base value PIO for correcting the packet index value written in a management table MOT12 of the second stream management data MOI12 is written.

The first and second stream management data MOI11 and MOI12 generated in the above manner are stored in the storage medium 4 in place of the stream management data MOI which has been stored so far.

Note that a PTS representing the temporal position of a packet including the start point of the deletion range is written as an end time (end point) in the header MOH11 of the first stream management data MOI11. In addition, a PTS representing the temporal position of a packet including the end point of the deletion range is written as a start time (restart point) in the header MOH12 of the second stream management data MOI12. Furthermore, the time stamp base value TSO for correcting the PTS written in the management table MOT12 of the second stream management data MOI12 may be written in the header MOH12.

The end point change processing function 213 performs the following processing after the stream data STR is segmented and the first and second stream management data MOI11 and MOI12 are generated. The end point change processing function 213 causes the video decoder 26 to experimentally and continuously decode the segmented first and second stream data STR11 and STR12, and measures the occupied state of the buffer of the video decoder 26. The end point change processing function 213 then determines on the basis of the measurement result whether the buffer of the video decoder overflows or underflows. Upon determining that the buffer overflows or underflows, the end point change processing function 213 changes the value of the end packet index or end time written in the header MOH11 of the first stream management data MOI11 to a value corresponding to a position on the upstream side on a time basis.

The stream data playing processing function 214 performs the following processing. When causing the decoders 25 and 26 to decode the second stream data STR12 following the first stream data STR11, the stream data playing processing function 214 subtracts the packet index base value PIO written in the second stream management data header MOH12 from the value of the packet index written in the second stream management table MOT12, and causes the decoders to start decoding the packet designated by the packet index value after the subtraction.

If the time stamp base value TSO is written in place of the packet index base value PIO, the stream data playing processing function 214 subtracts the time stamp base value TSO written in the second stream management data header MOH12 from the PTS value written in the second stream management table MOT12, and causes the decoders to start decoding the packet designated by the PTS value after the subtraction.

The operation of the television reception terminal apparatus having the above arrangement will be described next.

(1) Partial Deletion of Stream Data STR Stored in Storage Medium 4

Assume that a user has designated a deletion range and input a delete instruction for the stream data STR of a program content stored in the storage medium 4 by using the input device 7. In this case, the stream data segmentation processing function 211 of the management file control module 21 starts, and reads out the stream data STR designated as the deletion target from the storage medium 4. A packet sequence completely included in the deletion range designated in the readout stream data STR is deleted while being encrypted. Assume that as denoted by reference symbol (a) in FIG. 7, a range extending from the packet sequence SEQ2 to the packet sequence SEQ4 in the stream data STR is designated as a deletion range. In this case, the packet sequence SEQ3 completely included in the designated deletion range is deleted.

Figure 7:
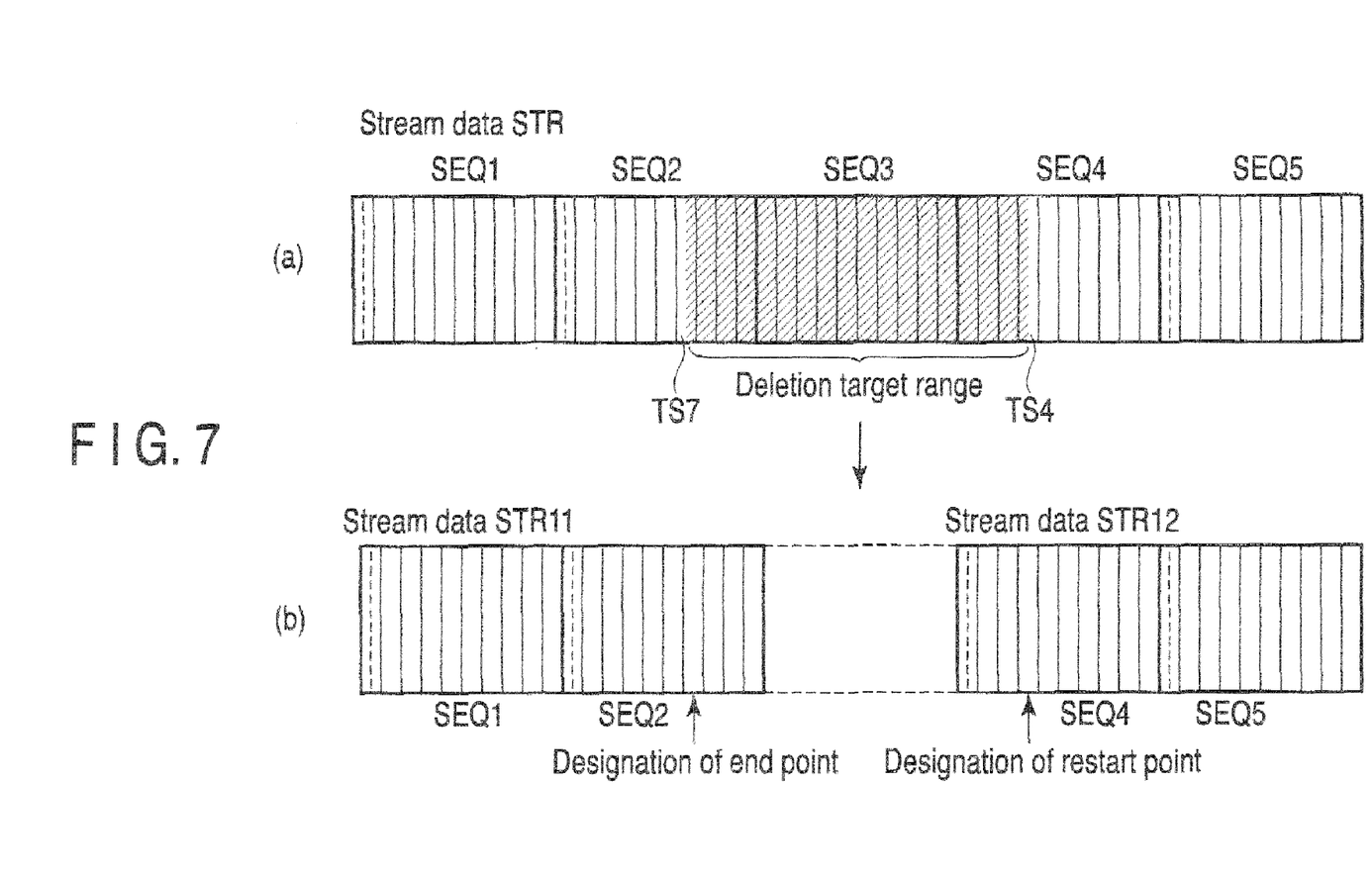
FIG. 7 is a view showing an example of a stream data file segmentation result accompanying partial deletion of a stream data file.

With this deletion processing, as denoted by reference symbol (b) in FIG. 7, the readout stream data STR is segmented into the first stream data STR11 from the packet sequence SEQ1 located at the head of the stream data to the packet sequence SEQ2 including the start point of the designated deletion range, and the second stream data STR12 from the packet sequence SEQ4 including the end point of the designated deletion range to the packet sequence SEQ5 located at the back end of the stream data STR.

(2) Creation of Stream Management Data Upon Partial Deletion of Stream Data

The stream management data segmentation processing function 212 of the management file control module 21 starts, and reads out the stream management data MOI corresponding to the stream data STR as a target for the deleting/editing processing from the storage medium 4. The stream management data segmentation processing function 212 then generates the first and second stream management data MOI11 and MOI12 corresponding to the segmented first and second stream data STR11 and STR12 on the basis of the readout stream management data MOI.

Figure 8A:
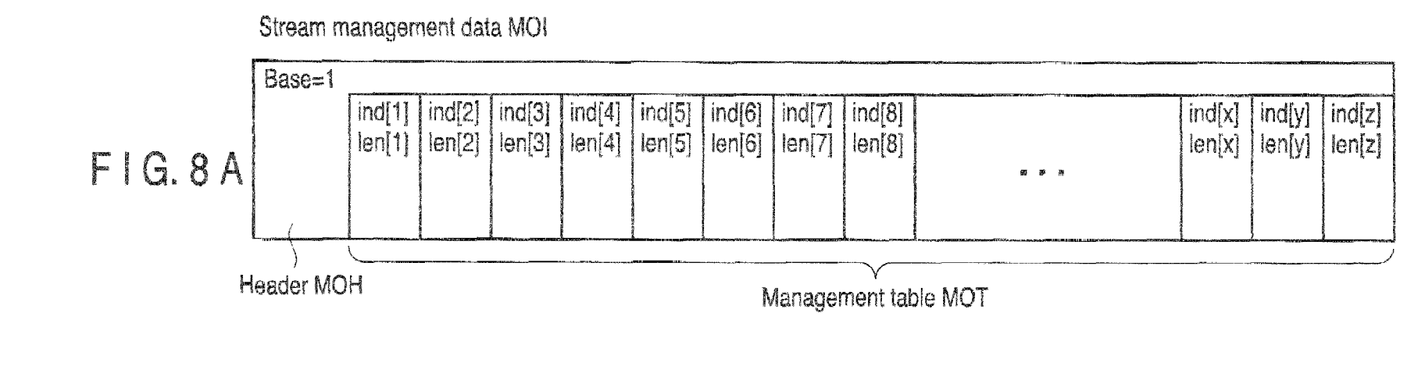
FIGS. 8A and 8B are views showing an example of how stream management data is segmented upon partial deletion of a stream data file.
Figure 8B:
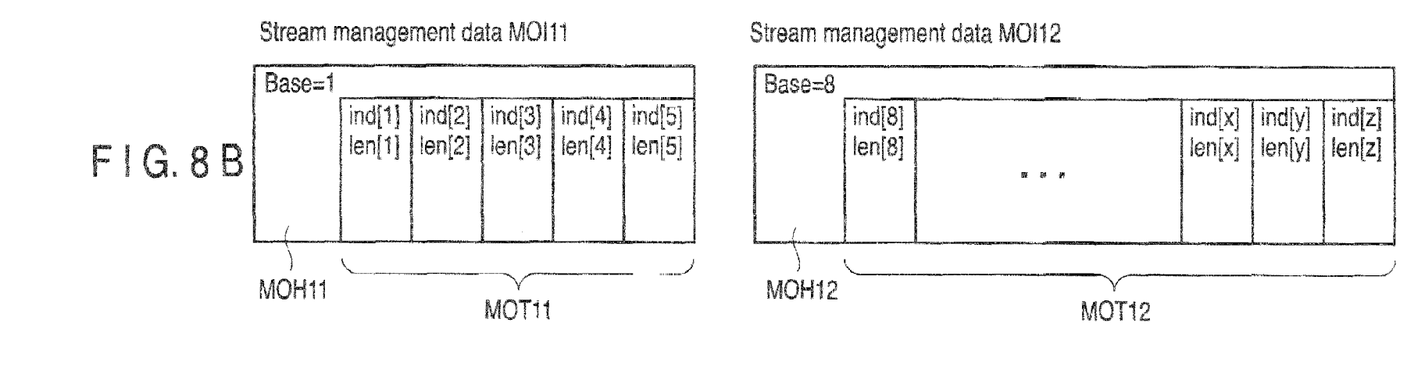

Assume that the stream management data MOI has an arrangement like that shown in FIG. 8A, the packet index value of the management table which designates an I frame corresponding to the start point of the above deletion range is "ind[5]", and the packet index value of the management table which designates an I frame corresponding to the end point of the deletion range is "ind[8]". In this case, as shown in FIG. 8B, the stream management data segmentation processing function 212 generates the first stream management data MOI11 including the management table MOT11 of packet index values "ind[1]" to "ind[5]" corresponding to a range before the start point of the above deletion range, and the second stream management data MOI12 including the management table MOT12 of packet index values "ind[8]" to "ind[z]" corresponding to a range after the end point of the deletion range. In this case, the header MOH of the stream management data MOI is used as the header MOH11 of the first stream management data MOI11 without any change. In contrast to this, the header MOH12 is newly attached to the second stream management data MOI12.

Subsequently, the packet index value of a packet including the start point of the above deletion range is written as an end packet index (end point) in the header MOH11 of the generated first stream management data MOI11. The packet index value of a packet including the end point of the deletion range is written as a start packet index (start point) in the header MOH12 of the second stream management data MOI12.

In addition, the packet index base value PIO for correcting the packet index written in the management table MOT12 of the second stream management data MOI12 is written in the header MOH12 of the second stream management data MOI12. For example, as shown in FIG. 8B, "Base=8" is written as the packet index base value PIO in the header MOH12 of the second stream management data MOI12.

The storage medium 4 stores the first and second stream management data MOI11 and MOI12 generated in the above manner in place of the stream management data MOI stored so far.

If the positions of packets are managed by PTSs, a PTS representing the temporal position of a packet including the start point of the deletion range is written as an end time (end point) in the header MOH11 of the first stream management data MOI11, and a PTS representing the temporal position of a packet including the end point of the deletion range is written as an end time (end point) in the header MOH12 of the second stream management data MOI12. In addition, the time stamp base value TSO for correcting the PTS written in the management table MOT12 is written in the header MOH11 of the second stream management data MOI12.

(3) Change Processing for End Point

When the above stream data STR segmentation process, and the creation process of the first and second stream management data MOI11 and MOI12 are complete, the end point change processing function 213 starts. The video decoder 26 then experimentally and continuously decodes the segmented first and second stream data STR11 and STR12. It is determined on the basis of a change in the occupied state of the buffer of the video decoder 26 whether the buffer of the video decoder 26 overflows or underflows. If it is determined that the buffer overflows or underflows, the value of the end packet index or end time written in the header MOH11 of the first stream management data MOI11 is changed to a value corresponding to a position on the upstream side on a time basis.

For example, first of all, the first stream management data MOI11 is searched for an I frame located before the end point in the first stream data STR11 on a time basis. This operation can be made by searching the stream management data table MOT for an I frame located immediately before the time (PTS) of the end point. Subsequently, the video decoder 26 decodes a packet sequence including a packet index designating the found I frame. With this operation, a video stream from the head of the I frame to the end point is decoded. This makes it possible to recognize the state of the buffer of the video decoder 26 in this interval on a frame basis.

The occupied state of the buffer of the video decoder 26 at the start point of the second stream data STR12 is checked. It is possible to search for a start point by searching I frames after the start packet index designated for the second stream data STR12. In general, a start packet index designates an I frame. A video stream extending from the packet index including the designated I frame by a packet designation length is decoded.

The above experimental, decoding processing makes it possible to grasp the occupied state of the buffer of the video decoder 26 before and after the concatenation point between the first stream data STR11 and the second stream data STR12.

Figure 9A:
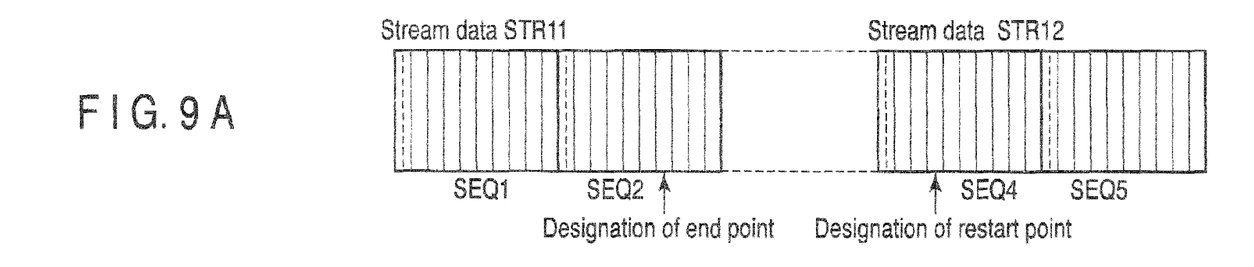
FIGS. 9A to 9C are views for explaining end point changing processing in consideration of the overflow of a decoder buffer.
Figure 9B:
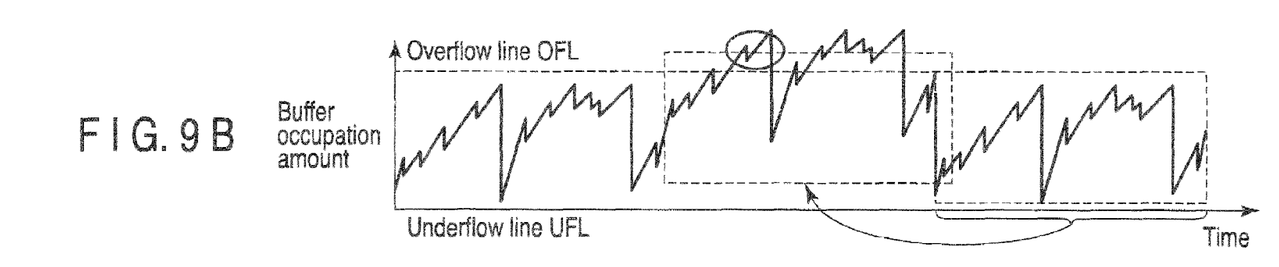
Figure 9C:
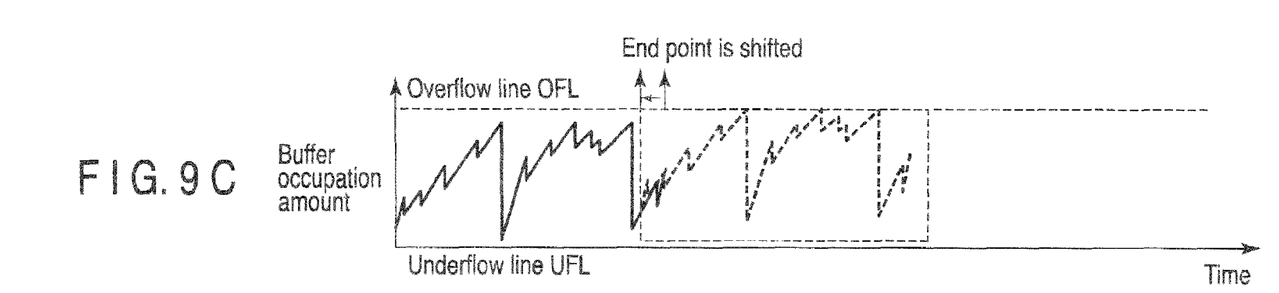

In the case shown in FIGS. 9A to 9C, concatenating the TS packet designated as an end point and the TS packet designated as a start point and continuously decoding the resultant packet reveals that the buffer of the video decoder 26 partially overflows, as shown in FIG. 9B. In this case, the position of the end point is changed to a position on the upstream side with respect to the previously designated point on a time basis, as shown in FIG. 9C. This can prevent the buffer of the video decoder 26 from overflowing after the concatenation point.

Figure 10A:
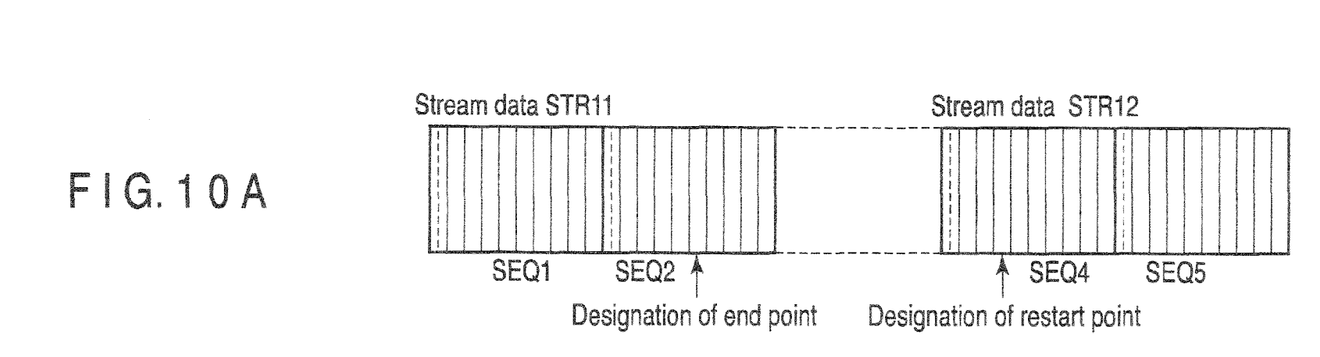
FIGS. 10A to 10C are views for explaining end point changing processing in consideration of the underflow of the decoder buffer.
Figure 10B:
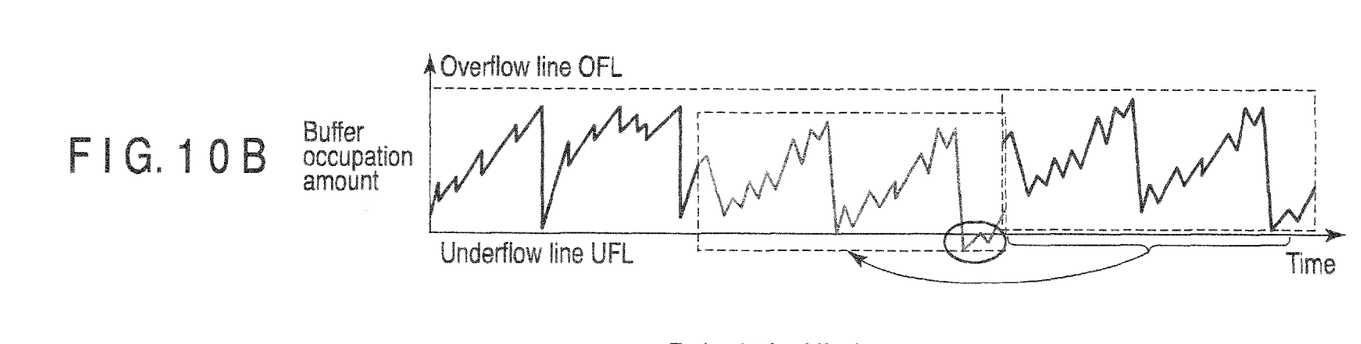
Figure 10C:
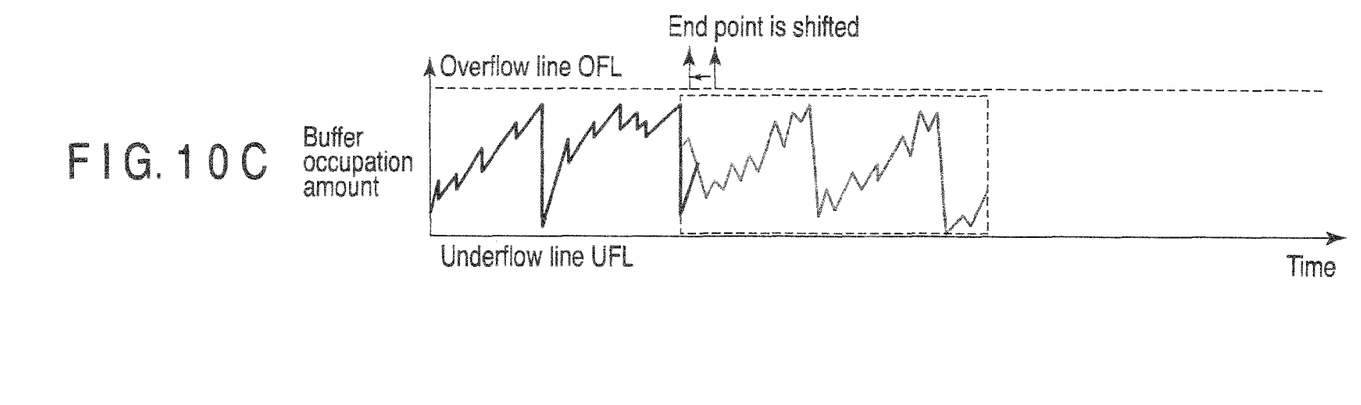

In the case shown in FIGS. 10A to 10C, the buffer of the video decoder 26 underflows, as shown in FIG. 10B. In this case, the end point is changed to a position on the upstream side on a time basis as shown in FIG. 10C to prevent the buffer from underflowing after the concatenation point as in the above case in which the buffer overflows. Note that since a restart point is an intraframe (I frame), it is impossible to adjust the point.

If the occupied state of the buffer of the video decoder 26 can be grasped by only performing syntax analysis, it suffices to predict the occurrence of the overflow or underflow of the buffer of the video decoder 26 by performing syntax analysis without decoding the video stream.

(4) Playing of Stream Data After Partial Deletion

Assume that the user has operated the input device 7 to input a playing instruction upon designating a playing target program. In this case, the stream data playing processing function 214 of the management file control module 21 starts. First of all, the stream data playing processing function 214 decodes and plays the first stream data STR11 in accordance with the first stream management data MOI11. Subsequently, the stream data playing processing function 214 decodes and plays the second stream data STR12 in accordance with the second stream management data MOI12.

When the second stream data STR12 is to be played, the packet index base value PIO written in the second stream management data header MOH12 is subtracted from the packet index value written in the corresponding second stream management table MOT12. Decoding starts from a TS packet whose packet index value is "ind[0]" after the subtraction.

In this case shown in FIG. 8B, for example, when the packet index base value PIO "Base=8" is subtracted from the packet index value "ind[8]" written in the start management table, the packet index value becomes "ind[0]". As a consequence, decoding and playing of the second stream data STR12 is restarted from the TS packet designated by the packet index written in the start management table.

It is therefore possible to seamlessly decode and play the second stream data STR12 from its head following the first stream data STR11.

Assume that the position of a TS packet including an I frame is designated by a PTS instead of a packet index value. In this case, when the second stream data STR12 is to be played, the time stamp base value TSO written in the second stream management data header MOH12 is subtracted from the PTS value written in the corresponding second stream management table MOT12. Decoding is started from the packet designated by the PTS value after the subtraction.

As described above, in this embodiment, when the stream data STR stored in the storage medium 4 is to be deleted/edited, first of all, the stream data segmentation processing function 211 deletes the packet sequence completely included in the designated deletion range in the stream data STR. With this operation, the stream data STR is segmented into the first stream data STR11 from the packet sequence located at the head of the stream data to the packet sequence including the start point of the designated deletion range, and the second stream data STR12 from the packet sequence including the end point of the designated deletion range to the packet sequence located at the back end of the stream data.

The stream management data segmentation processing function 212 then generates the first and second stream management data MOI11 and MOI12 corresponding to the first and second stream data STR11 and STR12 on the basis of the stream management data MOI corresponding to the stream data STR as a target for the above deleting/editing processing. The packet index value of the packet including the start point of the deletion range is written as an end packet index in the header MOH11 of the first stream management data MOI11. The packet index value of the packet including the end point of the deletion range is written as a start packet index (start point) in the header MOH12 of the second stream management data MOI12. In addition, the packet index base value PIO for correcting the packet index value written in the management table MOT12 of the second stream management data MOI12 is written in the header MOH12.

When the first and second stream data STR11 and STR12 are to be continuously played, the packet index base value PIO written in the second stream management data header MOH12 is subtracted from the packet index value written in the second stream management table MOT12. Decoding is started from the TS packet designated by the packet index value after the subtraction.

According to this embodiment, therefore, the mismatch caused by segmentation of the stream data STR in an encrypted condition before and after a deletion range is corrected at the time of decoding on the basis of the packet index base value PIO written in the stream management data header MOH. This makes it unnecessary to perform decoding, re-encoding, and re-encryption processing for the stream data STR itself, thereby greatly simplifying deleting/editing processing. As a result, even when the storage medium 4 with relatively low write and read speeds, e.g., a NAND type flash memory, is used, it is possible to shorten the time required for deleting/editing processing.

In addition, in this embodiment, the video decoder 26 experimentally and continuously decodes the segmented first and second stream data STR11 and STR12. It is then determined on the basis of the occupied state of the buffer of the video decoder 26 whether the buffer of the video decoder 26 overflows or underflows. If it is determined that the buffer overflows or underflows, the value of the end packet index or end time written in the header MOH11 of the first stream management data MOI11 is changed to a value corresponding to a position on the upstream side on a time basis. This can prevent the buffer of the video decoder 26 from overflowing or underflowing after the concatenation point when the first and second stream data STR11 and STR12 are continuously decoded and played.

In the above embodiment, partial deletion of stream data has been described. However, the present invention is not limited to this, and can also be applied to the deletion of a head portion of stream data and the deletion of an end portion of stream data. In addition, the present invention can be applied to a case in which two or more already existing stream data are seamlessly concatenated and edited.

Note that the present invention is not limited to the above embodiment. For example, the above embodiment has exemplified the television reception terminal apparatus. However, the present invention is not limited to this, and can be applied to an information terminal apparatus such as a personal computer or a cellular phone which downloads contents from a content providing site on the Web, a recording/playing apparatus such as a video recorder which records/plays contents, and a play-only apparatus which reads and plays contents from storage media.

In addition, the sequences, contents, and the like of segmentation processing for stream data, creation processing for stream management data, and playing processing for stream data can be variously modified and executed within the spirit and scope of the invention.

In brief, the present invention is not limited to the above embodiments, and constituent elements can be variously modified and embodied at the execution stage within the spirit and scope of the invention. Various inventions can be formed by proper combinations of a plurality of constituent elements disclosed in the above embodiments. For example, several constituent elements may be omitted from the all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
    a receiver which receives a plurality of packets including an encoded content; and
    a control unit which controls the communication apparatus to perform functions of;
    generating a plurality of sequence data including a predetermined number of packets;
    generating management data including a header and a plurality of data tables generated in correspondence to a packet including an intra-coded content, wherein each data table includes a packet index area identifying a packet number corresponding to the packet including the intra-coded content, and the header includes a number of packet information areas identifying the predetermined packets and a packet index base value area to be used for correcting a packet index in the packet index area;
    storing the plurality of sequence data and the management data; and
    deleting at least one of the sequence data whose packets are to be completely deleted in response to a delete instruction;
    wherein the plurality of sequence data comprises first sequence data which includes at least one sequence data located before the deleted at least one sequence data and second sequence data which includes at least one sequence data located after the deleted sequence data, and the management data comprises first management data corresponding to the first sequence data and second management data corresponding to the second sequence data;
    wherein the first management data includes a first header whose packet index base value area stores no data and first data tables, and the second management data includes a second header whose packet index base value area stores a packet number indicating a packet at a head of packets included in the second sequence and second data tables; and
    wherein the control unit further controls the communication apparatus to perform a function of correcting the packet number of each data table included in the second management data by subtracting the packet number in the packet index base value area of the second header from the packet number of a data table of the second management data.

2. The communication apparatus according to claim 1, wherein the first header and the second header further include a start packet index area identifying an initial packet to be played and an end packet index area identifying a last packet to be played.

3. The communication apparatus according to claim 2, wherein the end packet index area included in the first header stores a packet index value of an initial packet designated by the delete instruction and the start packet index area included in the second header stores a packet index value of a last packet designated by the delete instruction.

4. A communication apparatus comprising:
    a receiver which receives a plurality of packets including an encoded content; and
    a control unit which controls the communication apparatus to perform functions of;
    generating a plurality of sequence data including a predetermined number of packets;
    generating management data including a header and a plurality of data tables generated in correspondence to a packet including an intra-coded content, wherein each data table includes a time stamp area identifying a presentation time stamp corresponding to the packet including the intra-coded content, and the header includes a number of packet information areas identifying the predetermined packets and a time stamp base value area to be used for correcting the presentation time stamp in the time stamp area;
    storing the plurality of sequence data and the management data; and
    deleting at least one of the sequence data whose packets are to be completely deleted in response to a delete instruction;
    wherein the plurality of sequence data comprises first sequence data which includes at least one sequence data located before the deleted at least one sequence data and second sequence data which includes at least one sequence data located after the deleted sequence data, and the management data comprises first management data corresponding to the first sequence data and second management data corresponding to the second sequence data;
    wherein the first management data includes a first header whose time stamp base value area stores no data and first data tables, and the second management data includes a second header whose time stamp base value area stores a presentation time stamp indicating a packet at a head of packets included in the second sequence and second data tables; and
    wherein the control unit further controls the communication apparatus to perform a function of correcting a presentation time stamp of each data table included in the second management data by subtracting the presentation time stamp in the time stamp base value of the second header from the presentation time stamp of a data table of the second management data.

5. The communication apparatus according to claim 4, wherein the first header and the second header further include a start time area identifying an initial packet to be played and an end time area identifying a last packet to be played.

6. The communication apparatus according to claim 5, wherein the end time area included in the first header stores a presentation time stamp of an initial packet designated by the delete instruction and the start time area included in the second header stores a presentation time stamp of a last packet designated by the delete instruction.

7. A communication method for a communication apparatus comprising:
receiving a plurality of packets including an encoded content;
generating a plurality of sequence data including a predetermined number of packets;
generating management data including a header and a plurality of data tables generated in correspondence to a packet including an intra-coded content, wherein each data table includes a packet index area identifying a packet number corresponding to the packet including the intra-coded content, and the header includes a number of packet information areas identifying the predetermined packets and a packet index base value area to be used for correcting a packet index in the packet index area;
storing the plurality of sequence data and the management data; and
deleting at least one of the sequence data whose packets are to be completely deleted in response to a delete instruction;
wherein the generating the plurality of sequence data comprises generating first sequence data which includes at least one sequence data located before the deleted at least one sequence data and second sequence data which includes at least one sequence data located after the deleted sequence data, and the generating the management data comprises generating first management data corresponding to the first sequence data and second management data corresponding to the second sequence data;
wherein the first management data includes a first header whose packet index base value area stores no data and first data tables, and the second management data includes a second header whose packet index base value area stores a packet number indicating a packet at a head of packets included in the second sequence and second data tables; and
wherein the communication method further comprises correcting the packet number of each data table included in the second management data by subtracting the packet number in the packet index base value of the second header from the packet number of the respective data table of the second management data.

8. The communication method according to claim 7, wherein the first header and the second header further include a start packet index area identifying an initial packet to be played and an end packet index area identifying a last packet to be played.

9. The communication method according to claim 8, wherein the end packet index area included in the first header stores a packet index value of an initial packet designated by the delete instruction and the start packet index area included in the second header stores a packet index value of a last packet designated by the delete instruction.

10. A communication method for a communication apparatus comprising:
receiving a plurality of packets including an encoded content;
generating a plurality of sequence data including a predetermined number of packets;
generating management data including a header and a plurality of data tables generated in correspondence to a packet including an intra-coded content, wherein each data table includes a time stamp area identifying a presentation time stamp corresponding to the packet including the intra-coded content, and the header includes a number of packet information areas identifying the predetermined packets and a time stamp base value area to be used for correcting the presentation time stamp in the time stamp area;
storing the plurality of sequence data and the management data; and
deleting at least one of the sequence data whose packets are to be completely deleted in response to a delete instruction;
wherein the generating the plurality of sequence data comprises generating first sequence data which includes at least one sequence data located before the deleted at least one sequence data and second sequence data which includes at least one sequence data located after the deleted sequence data, and the generating the management data comprises generating first management data corresponding to the first sequence data and second management data corresponding to the second sequence data;
wherein the first management data includes a first header whose time stamp base value area stores no data and first data tables, and the second management data includes a second header whose time stamp base value area stores a presentation time stamp indicating a packet at a head of packets included in the second sequence and second data tables; and
wherein the communication method further comprises correcting a presentation time stamp of each data table included in the second management data by subtracting the presentation time stamp in the time stamp base value of the second header from the presentation time stamp of data table of the second management data.

11. The communication method according to claim 10, wherein the first header and the second header further include a start time area identifying an initial packet to be played and an end time area identifying a last packet to be played.

12. The communication method according to claim 11, wherein the end time area included in the first header stores a presentation time stamp of an initial packet designated by the delete instruction and the start time area included in the second header stores a presentation time stamp of a last packet designated by the delete instruction.

* * * * *